(12) United States Patent
Heyvaert et al.

(10) Patent No.: US 10,536,548 B2
(45) Date of Patent: Jan. 14, 2020

(54) REDUNDANT NETWORK ROUTING WITH PROXY SERVERS

(71) Applicant: Western Digital Technologies, Inc., San Jose, CA (US)

(72) Inventors: Michael Heyvaert, Sint-Katherina-Lombeek (BE); Wim De Waegeneer, Ghent (BE); Carl Rene D'Halluin, Zwijnaarde (BE)

(73) Assignee: Western Digital Technologies, Inc., San Jose, CA (US)

( * ) Notice: Subject to any disclaimer, the term of this patent is extended or adjusted under 35 U.S.C. 154(b) by 235 days.

(21) Appl. No.: 15/628,573

(22) Filed: Jun. 20, 2017

(65) Prior Publication Data
US 2018/0367634 A1    Dec. 20, 2018

(51) Int. Cl.
| | | |
|---|---|---|
| *H04L 29/08* | (2006.01) | |
| *H04L 12/707* | (2013.01) | |
| *H04L 12/741* | (2013.01) | |
| *H04L 12/66* | (2006.01) | |
| *H04L 12/751* | (2013.01) | |
| *H04L 12/24* | (2006.01) | |
| *H04L 12/713* | (2013.01) | |

(52) U.S. Cl.
CPC .......... *H04L 67/2814* (2013.01); *H04L 12/66* (2013.01); *H04L 45/22* (2013.01); *H04L 45/54* (2013.01); *H04L 41/12* (2013.01); *H04L 45/02* (2013.01); *H04L 45/586* (2013.01)

(58) Field of Classification Search
CPC .... G06F 3/065; G06F 3/0614; G06F 11/2056; H04L 67/1004; H04L 69/40; H04L 45/28
See application file for complete search history.

(56) References Cited

U.S. PATENT DOCUMENTS

| | | | |
|---|---|---|---|
| 6,202,169 B1 * | 3/2001 | Razzaghe-Ashrafi | ...................... G06F 11/20 714/1 |
| 8,707,085 B2 | 4/2014 | Bodke et al. | |
| 8,990,608 B1 | 3/2015 | Gupta et al. | |

(Continued)

FOREIGN PATENT DOCUMENTS

EP         1494422 A2     1/2005

OTHER PUBLICATIONS

Oracle "Redundancy, Load Balancing, and High Availability" found at <https://docs.oracle.com/cd/E14148_02/wlcp/ocsg41_otn/archoverview/alt-redundancy.html> dated 1994 and printed on Mar. 23, 2017, 11 pages.

*Primary Examiner* — Shirley X Zhang
(74) *Attorney, Agent, or Firm* — Patent Law Works LLP

(57) ABSTRACT

A set of proxy servers respectively located on a set of servers communicatively coupled via a first network switch and a second network switch are configured to listen on a predefined proxy IP address, and forward communication requests designated for the predefined proxy IP address to a connection pool of IP addresses for a first server. A proxy server hosted on the first server is configured to listen on IP addresses of the first server, and forward communication requests received on the first IP address and the second IP address to the predefined proxy IP address. The IP addresses of the first server including a first IP address associated with the first server's interface with the first network switch and a second IP address associated with the first server's interface with the second network switch.

20 Claims, 5 Drawing Sheets

(56) References Cited

U.S. PATENT DOCUMENTS

| | | |
|---|---|---|
| 9,396,206 B2 | 7/2016 | Lacapra et al. |
| 2008/0270644 A1 | 10/2008 | Rooney et al. |
| 2013/0332399 A1 | 12/2013 | Reddy et al. |
| 2015/0100725 A1 | 4/2015 | Ganapathy et al. |
| 2015/0334110 A1 | 11/2015 | Bishop et al. |
| 2016/0011950 A1 | 1/2016 | Caradonna et al. |
| 2017/0039115 A1 | 2/2017 | Biermayr et al. |
| 2019/0028577 A1* | 1/2019 | D?Souza ................. H04L 69/40 |

* cited by examiner

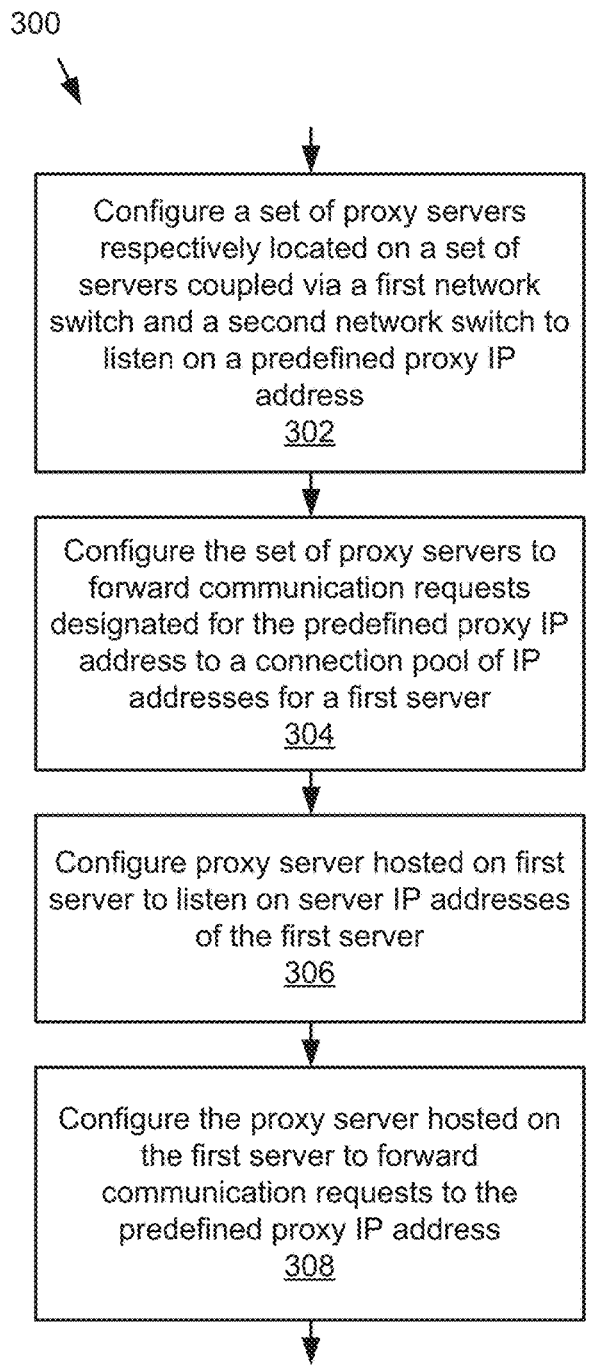
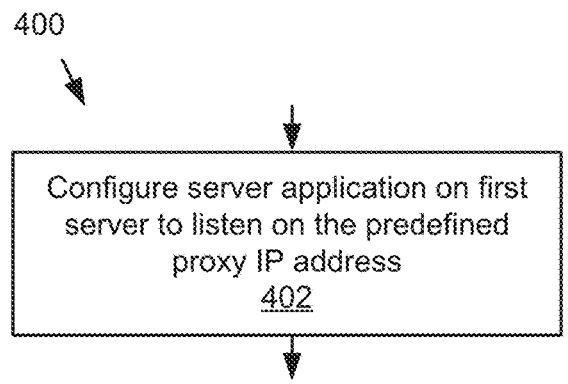
Figure 3
Figure 4

REDUNDANT NETWORK ROUTING WITH PROXY SERVERS

BACKGROUND

The present disclosure generally relates to high availability computing systems.

Computational theory divides the resources to solve computation problems into two basic categories: computation time, and memory space. With commercial off-the-shelf components, a system engineer may add computer resources to a system in a so called "vertical" direction, for example, by adding faster central processing units (CPUs) or graphical processing units (GPUs), increasing the CPU cache size or number of cache levels, adding additional volatile random-access memory (RAM), increasing the capacity of non-volatile storage devices (e.g., hard-disk drives (HDDs), solid-state drives (SSDs)), etc. The off-the-shelf nature of many commercial components limits how many resources a system engineer can vertically add. For instance, a motherboard may limit the type or number of CPUs which can be included in the system, or the CPU architecture may limit the amount of volatile random-access memory (RAM) that can be recognized in a system.

Thus, out of necessity or cost, a system engineer may add computer resources to a system in a so called "horizontal" direction by adding additional server computers (hereinafter "servers") to an interconnected distributed system of multiple servers. The interconnectedness of the system is often provided by off-the-shelf computer networking components. For example, Gigabit Ethernet as defined by the Institute of Electrical and Electronics Engineers' (IEEE) 802.3-2008 standard is sometimes used to connect a rack of servers together.

High availability (HA) computing systems aim to maximize the level of uptime of a system. With a horizontally scaled system, not only are the servers scrutinized as a potential point of failure, but the networking equipment connecting the servers are also scrutinized as a potential point of failure. In order to minimize the risk of system failure, redundant servers and/or networking devices are included in system designs.

Detection and mitigation of failure points are critical part of high availability computing systems. However, both the construction and administration of such functionality is often difficult and complex. Moreover, many community driven software projects may not take into account the variety of underlying network configurations used in horizontally scaled high availability systems.

FIGS. 1A and 1B are block diagrams illustrating a network configuration for an existing distributed system 100 available in the background art. The system 100 can be regarded as a high availability (HA) computing system. The system 100 includes a plurality of elements for redundancy. For example, the servers 106, 108, and 110, and network switches 102 and 104 may provide redundancy to increase the level of uptime of the system 100. The servers 106, 108, and 110 may provide functional redundancy amongst one another. The network switches 102 and 104 may also provide a level of redundancy amongst one another by providing separate connectivity paths between the servers 106, 108, and 110 and the broader networked world (not shown).

The servers 106, 108, and 110 are each of which is respectively communicatively coupled to two independent network switches 102 and 104. On the first network switch 102, the servers 106, 108, and 110, each have an Internet Protocol (IP) address of 10.0.2.x on the interface coupling the servers 106, 108, and 110 to the network switch 102. For instance, the server 106 has an IP address of 10.0.2.1 assigned to the interface that connects to the network switch 102, as so forth. The interfaces connecting the servers 106, 108, and 110 to the second network switch 104 have the format of 10.0.1.x. Both the 10.0.2.x and the 10.0.1.x address formats are indicted in FIG. 1A with the notation on the classless inter-domain routing (CIDR) notation—respectively 10.0.1.0/24 and 10.0.2.0/24. Thus, the server 106 has an IP address of 10.0.1.1 assigned to the interface that connects to the network switch 104, and so forth.

As shown in FIG. 2B, one communication path between the server 108 and the server 106 extends through the network switch 102 on the 10.0.2.0/24 subnet. The second communication path extends from the server 108 through the network switch 104 on the 10.0.1.0/24 subnet to the server application 154 running on the server 106. Again, assuming that the network switch 104 is grey to indicate that the network switch has experienced the first network switch failure in the system 100, the client application 152 monitors the two communication paths to determine when the network switch failure has occurred in order to mitigate the problem.

The application-specific construction of such a mechanism provided by existing solutions involve modifications to both the client application 152 and the server application 154. Moreover, in some cases, such an application-specific implementation may be limited to the specific network configuration (e.g., two independent network switches with a server application hosted on a first server and a client application hosted on a second server).

Thus, monitoring network switches for the redundancy desired in the depicted system 100 sometimes requires significant hardware or software modifications, thereby making the construction of such functionality difficult.

In attempting to reduce the complexity of redundant network switches, various solutions have been proffered. In one typical example, the domain name system (DNS) is configured as a round-robin system. Another DNS solution involves a DNS entry with a low time to live (TTL) and monitoring which IP address are responsive. Sometimes software application cache DNS resolution, and thus both DNS-based solutions may be inadequate solutions. Another typical example involves using a virtual IP address, but such a solution can reduce effective bandwidth and may require network reconfiguration. In another example, network interface card (NIC) bonding and the link aggregation control protocol (LACP) are used to aggregate the redundant communication paths into a single logical link, but link aggregation is complex and does not afford application level granularity.

SUMMARY

In an innovative aspect, a system includes a first network switch, a second network switch, a first server, and a second server. The first server includes a first network interface, a second network interface, and a first proxy server. The first network interface communicatively couples the first server to the first network switch and is associated with a first Internet Protocol (IP) address. The second network interface communicatively couples the first server to the second network switch as is associated with a second IP address. The first proxy server is configured to listen on the first IP address and the second IP address and forward communication requests to a predefined proxy IP address. The second server includes a third network interface, a fourth network interface, and a second proxy server. The third network interface communicatively couples the second server to the first network switch and is associated with a third IP address. The fourth network interface communicatively couples the second server to the second network switch and is associated with a fourth IP address. The second proxy server is configured to listen on the predefined proxy IP address and forward communication requests designated for the predefined proxy IP address to an IP address from a connection pool of IP addresses for the first server. The connection pool of IP addresses includes the first IP address and the second IP address.

In another innovative aspect, a method comprising: configuring a set of proxy servers respectively located on a set of servers communicatively coupled via a first network switch and a second network switch to listen on a predefined proxy IP address; configuring the set of proxy servers to forward communication requests designated for the predefined proxy IP address to a connection pool of IP addresses for a first server; configuring a proxy server hosted on the first server to listen on IP addresses of the first server, where the IP addresses of the first server including a first IP address associated with an interface of the first server with the first network switch and a second IP address associated with an interface of the first server with the second network switch; and configuring the proxy server hosted on the first server to forward communication requests received on the first IP address and the second IP address to the predefined proxy IP address.

Other implementations of one or more of these aspects include corresponding systems, apparatus, and computer program products, etc., configured to perform the actions of the methods, such as instructions embodying the methods on computer storage devices.

These and other implementations may each optionally include one or more of the following features: that the connection pool includes the first IP address and the second IP address; configuring a server application on the first server to listen on the predefined proxy IP address; that the server application is a distributed application executing on the first server and the set of servers; that the predefined proxy IP address is a loopback address; that the first IP address and the second IP address are not loopback addresses; detecting failure of the first network switch; transmitting a notification of the failure of the first network switch through the second network switch; removing the first IP address from the connection pool responsive to the detected failure of the communicative coupling through the first network switch to the first IP address; and that communication requests received and forwarded by a server of the set of servers are load-balanced across IP addresses in the connection pool.

It should be understood that language used in the present disclosure has been principally selected for readability and instructional purposes, and not to limit the scope of the subject matter disclosed herein.

BRIEF DESCRIPTION OF THE DRAWINGS

FIG. 3 is a flow chart illustrating an example method for redundant network switch routing with proxy servers.

FIGS. 4 and 5 are flow charts illustrating further example methods for redundant network switch routing with proxy servers.

DETAILED DESCRIPTION

Figure 2:
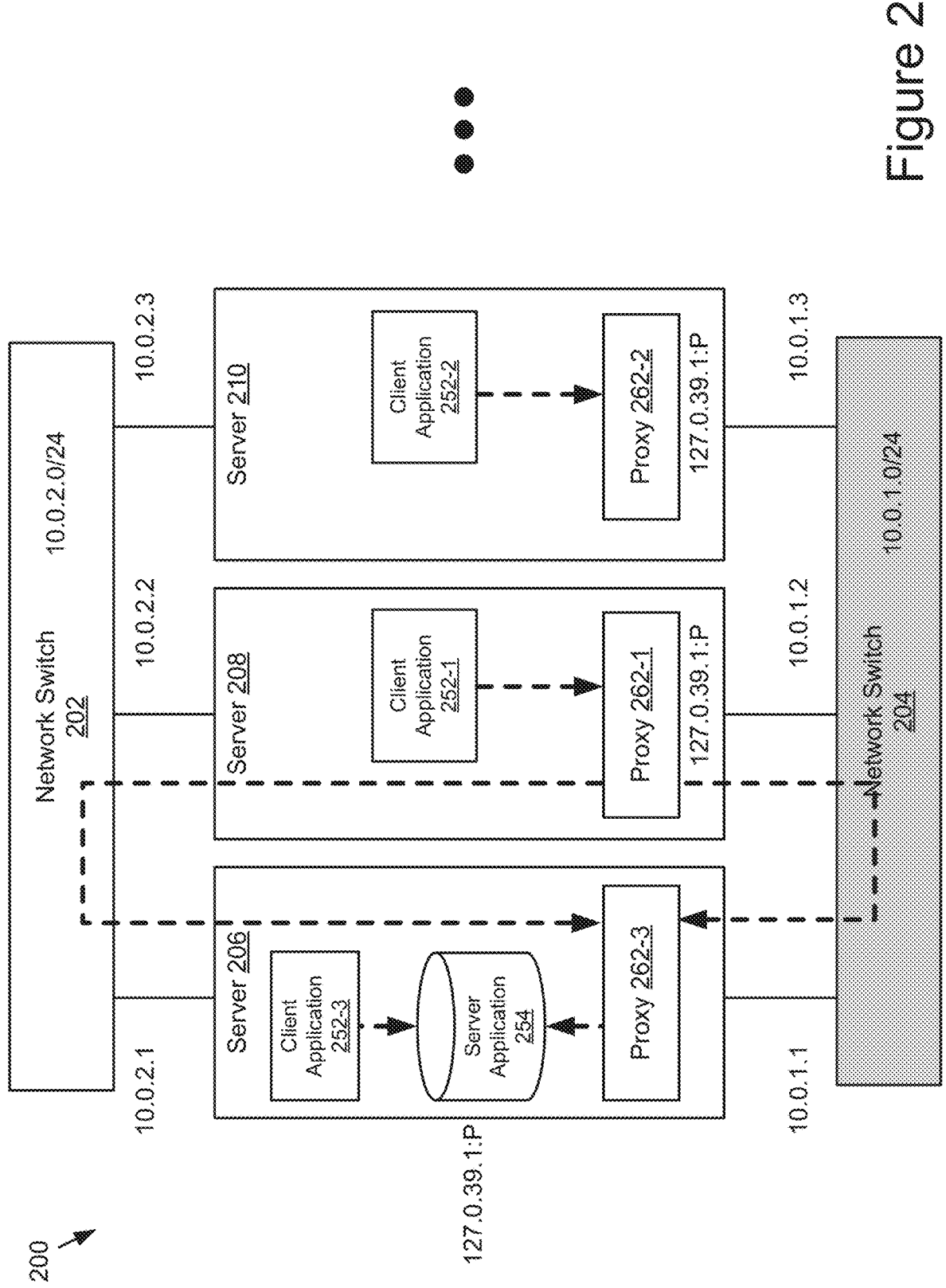
FIG. 2 is a block diagram illustrating example novel system configuration.

FIG. 2 is a block diagram illustrating a novel example novel system 200 configuration. The system 200 can be regarded as a HA computing system. The system 200 includes a plurality of elements for redundancy. For example, the servers 206, 208, and 210, and network switches 202 and 204 may provide redundancy to increase the level of uptime of the system 200. The servers 206, 208, and 210 may provide functional redundancy amongst one another. The network switches 202 and 204 may also provide a level of redundancy amongst one another by providing separate connectivity paths between the servers 206, 208, and 210 and the broader networked world (not shown).

In some implementations, the servers 206, 208, and 210 may, additionally or alternatively to redundant functionality amongst one another, serve as a horizontal partition in spreading computing resources. For example, a highly parallel computation problem may lend itself to being spread across the processors of each of the servers 206, 208, and 210. In another example, the servers 206, 208, and 210 may host one or more distinct database shards in a particular database architecture. Other variations are also possible and contemplated.

The network configuration of the system 200 may vary from the depicted example. For instance, while three servers (206, 208, and 210) are depicted, further implementations may include more or fewer servers. Generally, the system 200 includes two or more discrete network switches which provide distinct network-level connectivity to the servers 206, 208, and 210. In this way, if one of the switches fails, communication between the servers 206, 208, and 210 can be maintained through the other network switch. As described in further detail below, the network switch 204 is grey to indicate that the network switch has experienced a switch failure in the system 200.

As shown, the system 200 may include host various applications, such as client-server applications, storage applications, etc., and corresponding communication paths between the elements associated with the applications. For instance, by way of non-limiting example, the depicted system 200 includes communication paths between applications, such as a client application 252-1 on a server 208 and a server application 254 on another server 206. In some implementations, the servers 206, 208, and 210 may include an object storage system that stores redundant copies of objects on two or more servers. In some implementations, the servers 206, 208, and 210 may be alternatively referred to as nodes. While the example herein refers to the computers as servers, it should be appreciated that the technology extends to HA computing generally.

In the depicted implementation, the servers 206, 208, and 210 are each respectively communicatively coupled to two independent network switches 202 and 204. On the first network switch 202, the servers 206, 208, and 210, each have an IP address in the 10.0.2.0/24 subnet on the interface coupling the servers 206, 208, and 210 to the network switch 202. On the second network switch 204, the servers 206, 208, and 210, each have an IP address in the 10.0.1.0/24 subnet on the interface coupling the servers 206, 208, and 210 to the network switch 204.

Figure 1A:
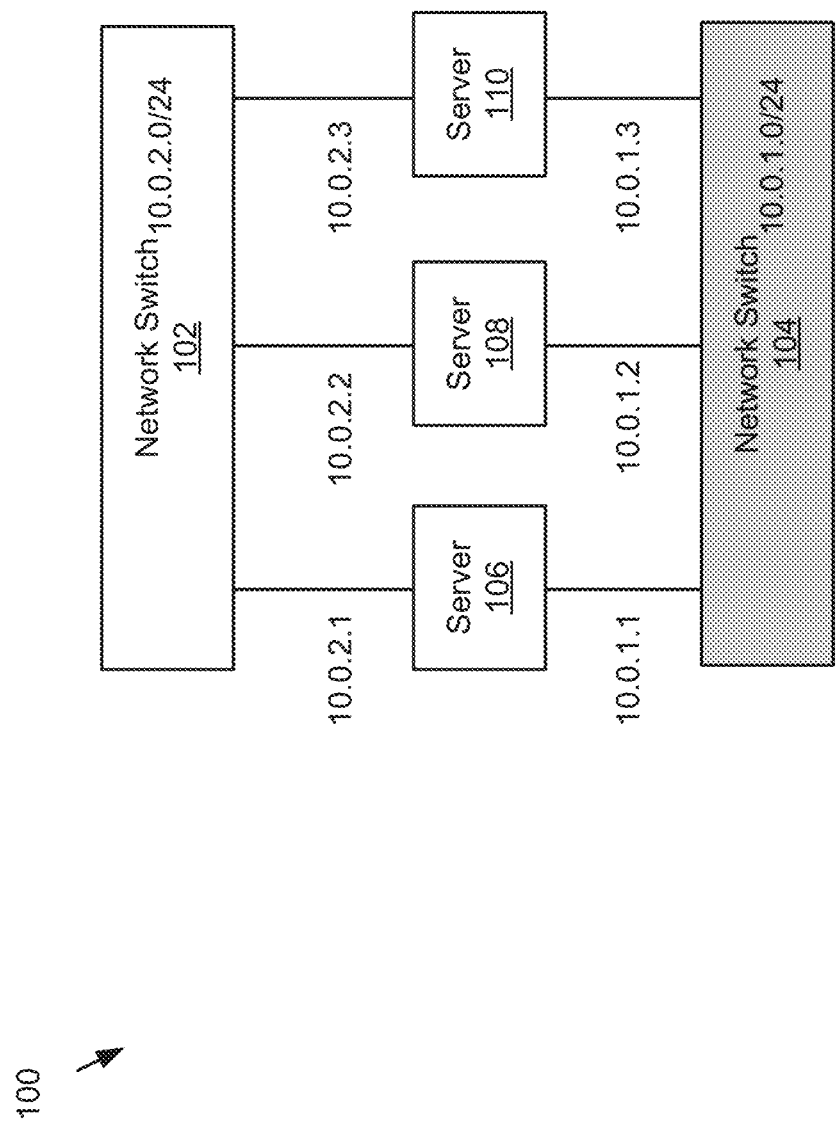
FIGS. 1A and 1B are a block diagrams illustrating example network configurations in the background art.
Figure 1B:
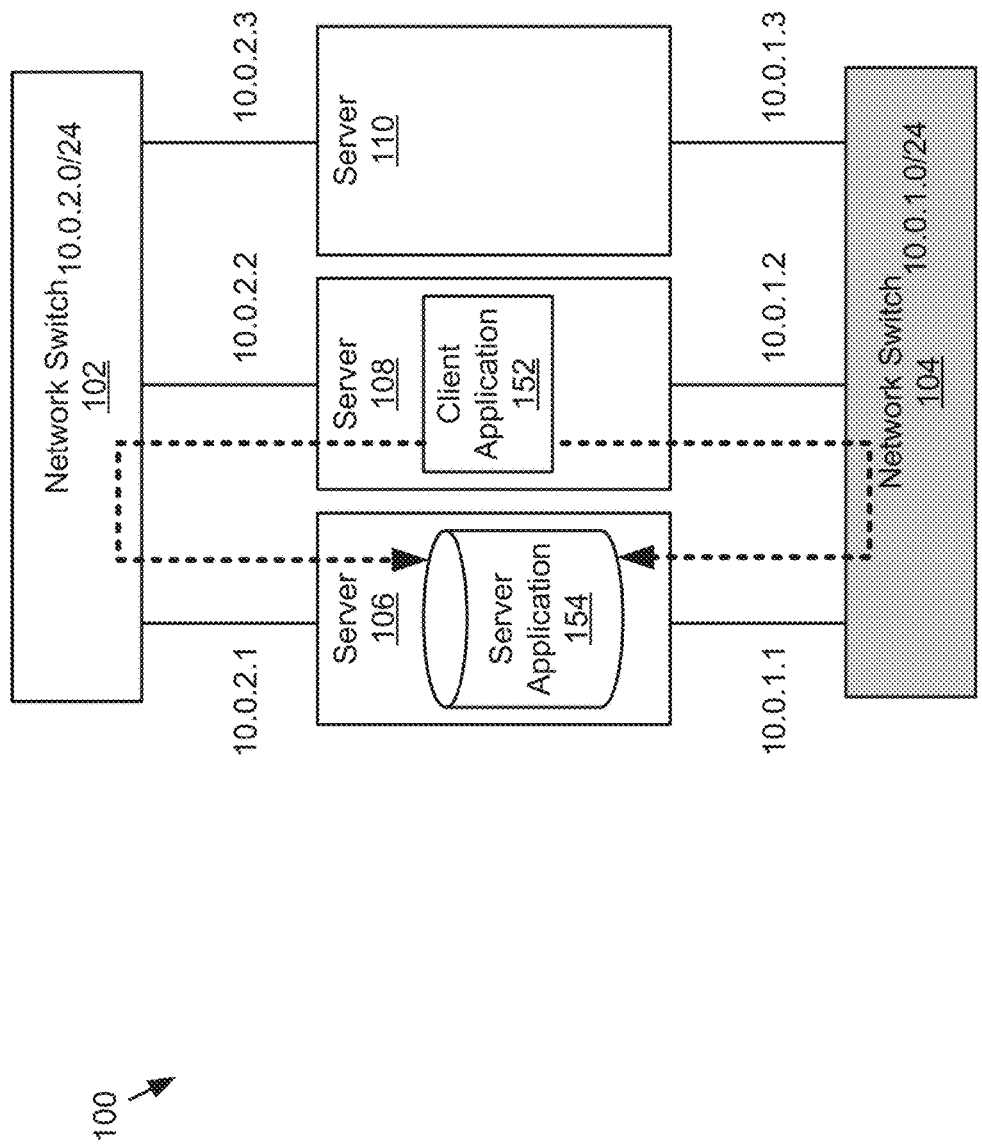

In contrast to existing solutions, such as those depicted in FIG. 1A and FIG. 1B, in some implementations, the system 200 may provide a HA overlay network using proxy servers 262 utilizing loopback IP addresses. As an example, with IP version 4 (IPv4), the reserved address space for loopback addresses includes 127.0.0.0/8, or in other words in IPv4 a loopback address encompasses the IP addresses from 127.0.0.0 to 127.255.255.255. Other IP versions or suitable alternatives are applicable and contemplated, such as IPv6. With respect to some IPv6 implementations, the IPv6 specification generally limits the loopback address to the single ::1/128 local host address, so loopback addresses may also be incorporated through the IPv4 loopback mapped address space, namely the ::ffff:127.0.0.0/104 range.

In some implementations, the network switches 202 and 204 may be implemented with layer-2 or layer-3 switches. For example, the network switches 202 and 204 may be 1000BASE-T switches as defined by IEEE 802.3ab. In some cases, the network switches may be a network hub which simply repeats incoming datagrams by broadcasting the datagrams to all of the ports.

The configuration of the system 200 may vary from the depicted example. For instance, there may be additional server applications spread across one or more servers 206, 208, and 210. There may be additional client applications executing on various servers. There may also be additional servers or switches. Generally, the system 200 includes two or more discrete separate network switches which provide distinct network-level connectivity to a set of servers 206, 208, and 210. In this way, if one of the switches fails, communication between the servers 206, 208, and 210 can be maintained through the other network switch.

As noted above, in the depicted example, the network switch 204 is grey to indicate that the network switch has experienced the first network switch failure in the system 200. Thus, rather than communicating over the 10.0.1.0/24 subnet, the servers 206, 208, and 210 can communicate over the 10.0.2.0/24 subnet.

The client applications 252 may connect to a local server application or a remote server application by using a common local address space. For instance, the client application 252-2 can communicate with the server application 254 by connecting through the proxy server 262-2 on IP address 127.0.39.1 and port P. Similarly, the client application 252-3 can connect to the server application on IP address 127.0.39.1 and port P. This provides a homogeneous addressing mechanism for a client application 252 to reference the server application 254.

For instance, a proxy server 262-3 running on the server 206 is configured to listen on the 10.0.2.1 IP address and the 10.0.1.1 IP address and forward communication requests to the 127.0.39.1 IP address. The server application 254 may be configured to listen on one or more transport specific ports (e.g., transmission control protocol (TCP) or UDP ports). In the depicted example, the server application 254 generally listens for new connections on port P. In some implementations, the proxy servers 262 may listen and forward communication on the same port P. In other implementations, the proxy servers 262 may be configured to translate port addresses on an application-by-application basis.

A proxy server may be a software application that can execute on a computer. HAProxy is one example of a proxy server that could be used in part in an implementation of the system 200, although other variations are also possible and contemplated. The proxy server may be configured to listen for, and forward communication requests from, certain electronic addresses (e.g., IP addresses). In particular, the proxy server 262-1 running on the server 208 may be configured to listen on the 127.0.39.1 IP address and forward communication requests designated for the 127.0.39.1 IP address to an IP address from a connection pool of IP addresses for the server 206 running the server application 254. For instance, the connection pool of IP addresses might include the 10.0.2.1 IP address and the 10.0.1.1 IP address for the server 206 running the server application 254. With the proxy server 262-3 listening on the 10.0.2.1 IP address and the 10.0.1.1 IP address, the communication may then be forwarded by the proxy server 262-3 to the server application 254 which is listening on the loopback IP address 127.0.39.1.

With the wide range of IPv4 loopback addresses available (i.e., approximately 16 million IP addresses), and derivatively the wide range of ::ffff:127.0.0.0/104 IPv6 addresses, a variety of different distributed application can be executed in a distributed fashion with the described HA overlay network using proxy servers 262 utilizing loopback IP addresses. Moreover, the technology can be transparent for client applications, server application, and application clusters. The technology provides an ease of configuration and administration. Assuming a properly configured proxy server 262, on each node, the server application can be addressed with its logical HA IP address and port (e.g., 127.0.39.1:P), and thereby provides a mechanism for homogeneous access across the servers 206, 208, and 210. For instance, the server 208 could host a server application with a logical HA IP address of 127.0.39.2, and the server 210 could host a server application with a logical HA IP address of 127.0.39.3, etc.

The proxy servers 262 can be configured to detect that a communication path is down. For instance, the proxy server 262-1 may detect that the communication path through the network switch 204 has been lost. A series of missing TCP acknowledgements (ACKs) may indicate that the communication path through the network switch 204 has been lost. Thus, the proxy server 262-1 may remove the 10.0.1.1 IP address from the connection pool until the issue with the network switch 204 is resolved. Proxy server 262-1 would then forward communication requests through to the 10.0.2.1 IP address rather than the 10.0.1.1 IP address.

When a proxy server 262 detects that a communication path is down, the proxy server 262 can transmit a notification to a system administrator indicating that the communication path is down. For instance, the notification may be transmitted though the network switch 202 since it has not yet failed. The system administrator may then be able to diagnose the network switch 204. With the removal of the 10.0.1.1 from the connection pool of the proxy server 262-1, the system administrator may be able to diagnose and remove the network switch 204 without causing downtime for the system 200 as a whole.

When both communication paths are working and available, the proxy server 262-1 may load-balance across the IP addresses in the connection pool. For example, the proxy server 262-1 may forward communication requests to the 10.0.2.1 and the 10.0.1.1 IP addresses in a round-robin fashion.

FIG. 3 is a flow chart illustrating a method 300 for redundant network switch routing with proxy servers. In block 302, the method 300 may configure a set of proxy servers respectively located on a set of servers coupled to at least two network switches (e.g., via a first network switch and a second network switch) to listen on a predefined proxy IP address. For instance, with reference to FIG. 2, the set of proxy servers 262-1 and 262-2 may be respectively located on the set of servers 208 and 210 communicatively coupled via a first network switch 202 and a second network switch 204. The proxy servers 262-1 and 262-2 may be configured to listen on a predefined proxy IP address (e.g., 127.0.39.1). The predefined proxy IP address on which a proxy server (e.g., 261-1, 262-2, etc.) listens corresponds to the IP address assigned to a high availability server application (e.g., server application 254), which is in this example embodiment is 127.0.39.1. In some cases, specific ports may be specified to be listened on. For example, the proxy servers 262 may listen on port P. The predefined IP address may be a loopback address and may form an overlay IP space that logically identifies a server or node from a set of servers or nodes. For instance, the 127.0.39.1 IP address depicted in FIG. 2 may logically identify server applications running on the server 206. While not shown, server applications hosted on servers 208 and 210 may be respectively assigned the 127.0.39.2 and 127.0.39.3 IP addresses.

In block 304, the method 300 may configure the set of proxy servers to forward communication requests designated for the predefined proxy IP address to a connection pool of IP addresses for a first server. For instance, with reference to FIG. 2, the set of proxy servers 262-1 and 262-2 may be configured to forward communication requests designated for the predefined proxy IP address (e.g., 127.0.39.1) to the connection pool of IP addresses for the first server 206. For example, the 127.0.39.1 IP address may have a connection pool that includes the 10.0.2.1 and 10.0.1.1 IP address. In this way, the proxy servers can functionally overlay the proxy server address space (e.g., the loopback address space) over the existing IP address space (e.g., the non-loopback addresses). In some instances, the existing IP address space may include private IP address (e.g., 10.0.0.0/8, 172.16.0.0/12, and 192.168.0.0/24), while in other implementations, the IP address space may include publically routable IP addresses. While the depicted example include two network switches 202 and 204 with the server 206 having two IP addresses (e.g., 10.0.2.1 and 10.0.1.1), the number of independent network switches and the number of IP addresses per server may be larger. Additional communication paths may provide an increased level of network-level redundancy.

In block 306, the method may configure the proxy server hosted on the first server to listen on the server IP addresses of the first server. For instance, with reference to FIG. 2, a proxy server 262-3 hosted on the first server 206 may be configured to listen on IP addresses (e.g., 10.0.2.1 and 10.0.1.1) of the first server 206. The 10.0.2.1 IP address of the first server 206 is associated with the interface of the first server 206 with the first network switch 202. The 10.0.1.1 IP address is associated with the interface of the first server 206 with the second network switch 204.

In block 308, the method 300 may configure the proxy server hosted on the first server to forward communication requests to the predefined proxy IP address. For instance, with reference to FIG. 2, the proxy server 262-3 hosted on the first server 206 may be configured to forward communication requests received on the IP addresses (e.g., 10.0.2.1 and 10.0.1.1) of the first server 206 to the 127.0.39.1 IP address. The proxy server 262-3 may forward requests associated with the two separate communication paths (e.g., one through the network switch 202 and the other through the network switch 204) to the server application 254 executing on the server 206.

FIG. 4 is a flow chart illustrating a further example method 400 for redundant network switch routing with proxy servers. In block 402, the method may configure a server application on the first server to listen on the predefined proxy IP address. For instance, with reference to FIG. 2, the server application 254 on the first server 206 may be configured to listen on the predefined proxy IP address. Specifically, the server application 254 may be configured to listen on one or more specific TCP or UDP ports for incoming connections or data. Many server applications may, in some cases, be modified through a configuration interface to specify which interface or IP addresses and ports to listen on. For example, MongoDB is generally configured to listen on TCP port 27017 but this setting can be changed through a configuration file option (e.g., the 'net.port' setting) or through a command line flag (e.g., the '-port' flag). As another example, the MongoDB configuration file can be edited to specify IP addresses to listen on (e.g., the 'net.bindIP' setting). Thus, for the MongoDB example, the configuration may include the following lines:

```
...
net:
  port: P
  bindIP: 127.0.39.1
...
```

Figure 5:
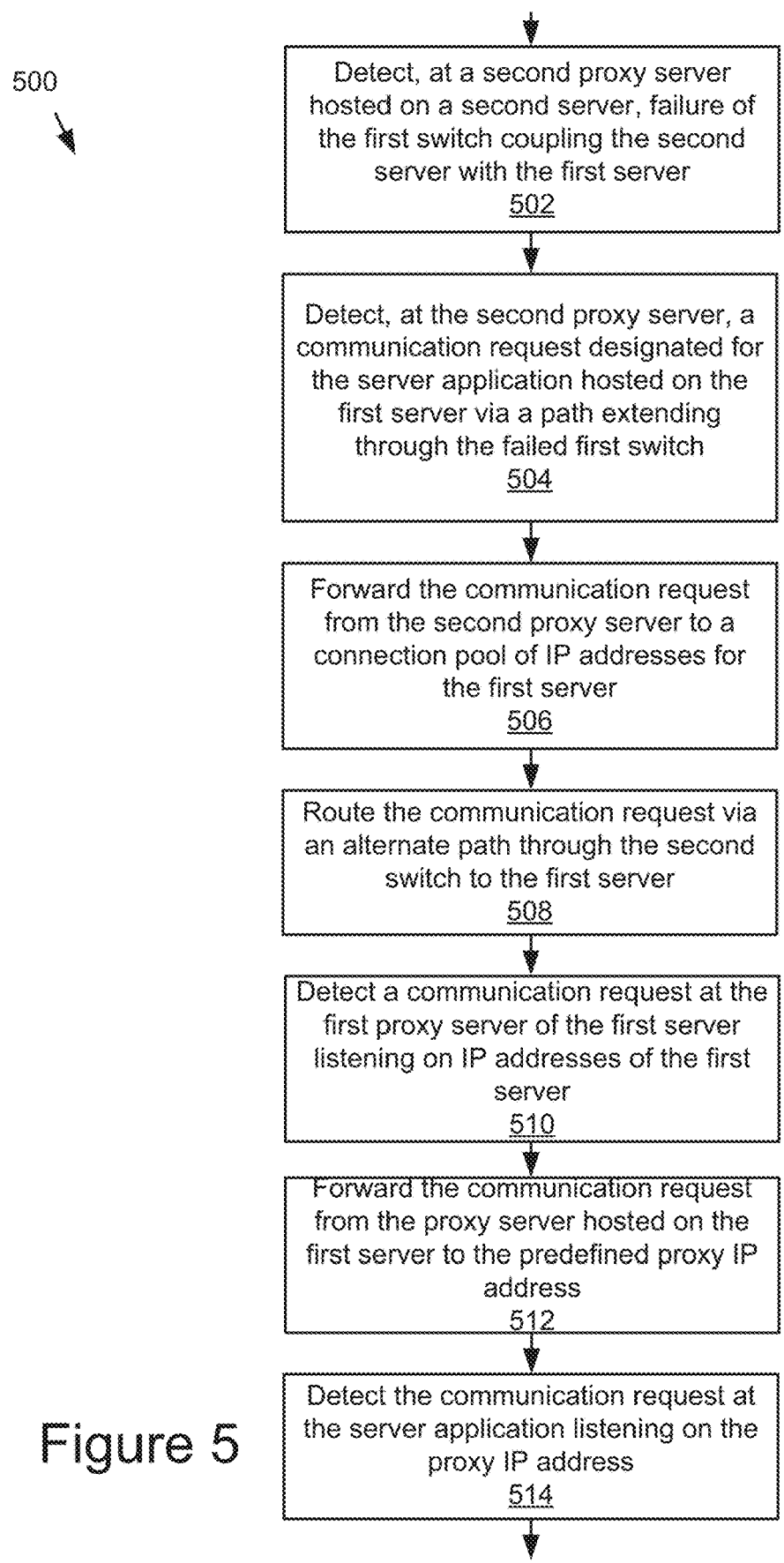

FIG. 5 is a flow chart illustrating a further example method 500 for redundant network switch routing with proxy servers. For convenience and ease of understanding, this method is non-limitingly described with reference to FIG. 2. In block 502, the method 500 may detect, at a second proxy server 262-1 hosted on a second server 208, failure of the first network switch 202 coupling the second server 208 with the first server 206. A variety of network-level mechanism may be employed to detect the network switch 202 failure. A TCP timeout may indicate that the network switch 202 is faulty. After a number of TCP keepalive retries, the proxy server 262-1 may conclude that the communication path across the network switch 202 is broken. An internet control message protocol (ICMP) mechanism such as a regular ping may be used to determine if and/or when a network switch has failed.

In block 504, the method 500 may detect, at the second proxy server 262-1, a communication request that is designated for the server application 254 hosted on the first server 206 via a path extending through the failed first network switch 202. In some implementations, the proxy server 262-1 may determine that the communication request is designated for a specific server application based on the IP address and port that the communication request was received through. For example, the 127.0.39.1 IP address may indicate that the communication request is destined for the server 206, and the port P may indicate that within the server 206 the communication request is destined for the server application 254.

In block 506, the method 500 may forward the communication request to the connection pool of the IP addresses for the first server 206. For example, if the communication request was originally designated to travel via a path extending through the failed first network switch 202, the proxy server 262-1 may remove the IP address 10.0.2.1 from the connection pool and forward 506 the communication request from the second proxy server 262-1 to the remaining address in the connection pool for the first server 206, namely the IP address 10.0.1.1.

In block 508, the method 500 may route the communication request via an alternative path through the second switch 204 to the first server 206, and in block 510, the method 500 (e.g., the proxy server 262-3) may detect a communication request by listening on the IP addresses of the first server 206. For instance, in the illustrated example, the proxy server 262-3 may listen on the 10.0.2.1 IP address and the 10.0.1.1 IP address. If the proxy server 262-3 detects a break in the communication path (e.g., a failure of network switch 202), the proxy server 262-3 may quit listening on the effected IP address and provide notification to a system administrator.

In block 512, the method 500 (e.g., the proxy server 262-3) may forward the communication request from the proxy server 262-3 hosted on the first server 206 to the proxy IP address 127.0.39.1. In some cases a port number, or a set of port numbers, may also be predefined so that the proxy server 262-3 can forward the communication request to the correct port number. In some cases, the port number that the proxy server is listening on and the port number that the communication requested is forwarded to may be different. In such case, the proxy server may include a port translation table that specifies how to route incoming communication requests on particular port numbers.

In block 514, the method 500 may detect the communication request at the server application 254. The server application 254 may open particular port numbers and listen for incoming connection on specific loopback addresses. In the depicted example, the server application 254 is listening on 127.0.39.1:P.

While at least one exemplary implementation has been presented in the foregoing detailed description of the technology, it can be appreciated that a vast number of variations may exist. It can also be appreciated that an exemplary implementation or exemplary implementations are examples, and are not intended to limit the scope, applicability, or configuration of the technology in any way. Rather, the foregoing detailed description will provide a convenient road map for implementing an exemplary implementation of the technology, it being understood that various modifications may be made in a function and/or arrangement of elements described in an exemplary implementation without departing from the scope of the technology, as set forth in the appended claims and their legal equivalents.

As will be appreciated, various aspects of the present technology may be embodied as a system, method, or computer program product. Accordingly, some aspects of the present technology may take the form of a hardware implementation, a software implementation (including firmware, resident software, micro-code, etc.), or a combination of hardware and software aspects that may generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, RAM, ROM, an EPROM, an EEPROM, a Flash memory, an optical fiber, a CD-ROM, an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that one or more blocks of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It can also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, it should be appreciated that modifications and/or adaptations to the various aspects may be made without departing from the scope of the present technology, as set forth in the following claims

What is claimed is:

1. A system, comprising:
    a first network switch;
    a second network switch;
    a first server comprising:
        a first network interface communicatively coupling the first server to the first network switch, the first network interface being associated with a first Internet Protocol (IP) address,
        a second network interface communicatively coupling the first server to the second network switch, the second network interface being associated with a second IP address, and
        a first proxy server configured to:
            listen on the first IP address and the second IP address; and
            forward communication requests to a predefined proxy IP address; and
    a second server comprising:
        a third network interface communicatively coupling the second server to the first network switch, the third network interface being associated with a third IP address,
        a fourth network interface communicatively coupling the second server to the second network switch, the fourth network interface being associated with a fourth IP address, and
        a second proxy server configured to:
            listen on the predefined proxy IP address; and
            forward communication requests designated for the predefined proxy IP address to an IP address from a connection pool of IP addresses for the first server, the connection pool of IP addresses including the first IP address and the second IP address.

2. The system of claim 1, wherein the first server further comprises a server application configured to listen on the predefined proxy IP address.

3. The system of claim 2, wherein the server application is a distributed application executing on the first server and the second server.

4. The system of claim 1, wherein the predefined proxy IP address is a loopback address.

5. The system of claim 4, wherein the first IP address, the second IP address, the third IP address, and the fourth IP address are not loopback addresses.

6. The system of claim 1, wherein the second proxy server is further configured to detect a failure of the communicative coupling through the first network switch.

7. The system of claim 6, wherein the second proxy server is further configured to transmit, through the second network interface, a notification of the failure of the communicative coupling.

8. The system of claim 6, wherein the second proxy server is further configured to remove the first IP address from the connection pool responsive to the detected failure of the communicative coupling.

9. The system of claim 1, wherein communication requests received and forwarded by the second proxy server are load-balanced across IP addresses in the connection pool.

10. A method, comprising:
    configuring a set of proxy servers respectively located on a set of servers communicatively coupled via a first network switch and a second network switch to listen on a predefined proxy Internet Protocol (IP) address;
    configuring the set of proxy servers to forward communication requests designated for the predefined proxy IP address to a connection pool of IP addresses for a first server;
    configuring a proxy server hosted on the first server to listen on IP addresses of the first server, the IP addresses of the first server including a first IP address associated with a first interface of the first server and a second IP address associated with a second interface of the first server, the first interface being with the first network switch and the second interface being with the second network switch; and
    configuring the proxy server hosted on the first server to forward communication requests received on the first IP address and the second IP address to the predefined proxy IP address.

11. The method of claim 10, wherein the connection pool includes the first IP address and the second IP address.

12. The method of claim 10, further comprising configuring a server application on the first server to listen on the predefined proxy IP address.

13. The method of claim 12, wherein the server application is a distributed application executing on the first server and the set of servers.

14. The method of claim 10, wherein the predefined proxy IP address is a loopback address.

15. The method of claim 14, wherein the first IP address and the second IP address are not loopback addresses.

16. The method of claim 10, further comprising detecting a failure of the first network switch.

17. The method of claim 16, further comprising transmitting a notification of the failure of the first network switch through the second network switch.

18. The method of claim 16, further comprising removing the first IP address from the connection pool responsive to the detected failure of the first network switch.

19. The method of claim 10, wherein communication requests received and forwarded by a server of the set of servers are load-balanced across IP addresses in the connection pool.

20. A system, comprising:
    means for communicatively coupling a first server and a second server through a first communication path;
    means for communicatively coupling the first server and the second server through a second communication path;
    means for listening on a loopback Internet Protocol (IP) address on the second server and forwarding communication requests designated for the loopback IP address to IP addresses associated with the first server through the first communication path or the second communication path; and means for listening on the IP addresses associated with the first server and forwarding communication requests received on the IP addresses to a loopback IP address on the first server.

* * * * *